United States Patent
Kadota et al.

(10) Patent No.: US 11,046,787 B2
(45) Date of Patent: Jun. 29, 2021

(54) POLYLACTIDE-GRAFTED CELLULOSE NANOFIBER AND PRODUCTION METHOD THEREOF

(71) Applicants: OSAKA RESEARCH INSTITUTE OF INDUSTRIAL SCIENCE AND TECHNOLOGY, Izumi (JP); DAIO PAPER CORPORATION, Shikokuchuo (JP)

(72) Inventors: Joji Kadota, Osaka (JP); Yasuyuki Agari, Osaka (JP); Hiroshi Hirano, Osaka (JP); Akinori Okada, Osaka (JP); Takaaki Imai, Shikokuchuo (JP)

(73) Assignees: OSAKA RESEARCH INSTITUTE OF INDUSTRIAL SCIENCE AND TECHNOLOGY, Osaka (JP); DAIO PAPER CORPORATION, Ehime (JP)

(*) Notice: Subject to any disclaimer, the term of this patent is extended or adjusted under 35 U.S.C. 154(b) by 0 days.

(21) Appl. No.: 16/612,552

(22) PCT Filed: May 9, 2018

(86) PCT No.: PCT/JP2018/018017
§ 371 (c)(1),
(2) Date: Nov. 11, 2019

(87) PCT Pub. No.: WO2018/207848
PCT Pub. Date: Nov. 15, 2018

(65) Prior Publication Data
US 2020/0123275 A1 Apr. 23, 2020

(30) Foreign Application Priority Data
May 12, 2017 (JP) .............................. JP2017-095975

(51) Int. Cl.
C08B 15/00 (2006.01)
C08G 63/08 (2006.01)
C08K 5/3432 (2006.01)

(52) U.S. Cl.
CPC .............. *C08B 15/00* (2013.01); *C08G 63/08* (2013.01); *C08K 5/3432* (2013.01)

(58) Field of Classification Search
None
See application file for complete search history.

(56) References Cited

U.S. PATENT DOCUMENTS

| 7,884,169 | B2* | 2/2011 | Shiraishi ................ C08G 63/06 |
| | | | 527/311 |
| 2007/0054816 | A1 | 3/2007 | Berthier et al. |
| 2008/0306235 | A1* | 12/2008 | Shiraishi ................ C08B 15/00 |
| | | | 527/311 |
| 2011/0196094 | A1 | 8/2011 | Hamad et al. |
| 2011/0319509 | A1 | 12/2011 | Dorgan et al. |
| 2013/0331536 | A1* | 12/2013 | Harkonen ................ C08J 3/226 |
| | | | 527/300 |
| 2018/0346607 | A1* | 12/2018 | Cordova ................... C08L 1/08 |
| 2020/0123275 | A1* | 4/2020 | Kadota ................... C08B 15/00 |

FOREIGN PATENT DOCUMENTS

| CN | 101168616 A | * | 4/2008 |
| JP | 62-240066 A | | 10/1987 |
| JP | 2004-359840 A | | 12/2004 |
| JP | 2005-35134 A | | 2/2005 |
| JP | 2007-536426 A | | 12/2007 |
| JP | 2011-252102 A | | 12/2011 |
| JP | 2013-519736 A | | 5/2013 |
| JP | 5545985 B2 | * | 7/2014 |
| WO | 2006/001076 A1 | | 1/2006 |
| WO | 2008/143322 A1 | | 11/2008 |

OTHER PUBLICATIONS

International Search Report dated Jul. 17, 2018, issued in counterpart International Application No. PCT/JP2018/018017 (2 pages).
Extended Search Reported dated Nov. 5, 2020, issued in counterpart EP Application No. 18798416.6 (6 pages).

* cited by examiner

*Primary Examiner* — Peter A Salamon
(74) *Attorney, Agent, or Firm* — Westerman, Hattori, Daniels & Adrian, LLP

(57) ABSTRACT

Provided are a polylactide-grafted cellulose nanofiber that is suitable as a molding material, and a production method thereof. A polylactide-grafted cellulose nanofiber includes grafted cellulose having a graft chain bonding to cellulose constituting a cellulose nanofiber, wherein the graft chain is a polylactide, and a ratio of an absorbance derived from C=O of the polylactide to an absorbance derived from O—H of the cellulose on an infrared absorption spectrum is no less than 0.01 and no greater than 1,000. In addition, a production method of a polylactide-grafted cellulose nanofiber includes carrying out graft polymerization of a lactide to cellulose constituting a cellulose nanofiber in the presence of an organic polymerization catalyst which includes an amine and a salt obtained by reacting the amine with an acid. As the organic polymerization catalyst, 4-dimethylaminopyridine and 4-dimethylaminopyridinium triflate are preferred.

5 Claims, No Drawings

POLYLACTIDE-GRAFTED CELLULOSE NANOFIBER AND PRODUCTION METHOD THEREOF

TECHNICAL FIELD

The present invention relates to a polylactide-grafted cellulose nanofiber and a production method thereof.

BACKGROUND ART

In recent years, from the perspective of conservation of global environment, biodegradable polymers that can be decomposed in natural environment due to actions of microorganisms existing in soil and water have attracted attention, and a variety of biodegradable polymers are developed. A typical example of the biodegradable polymer is a polylactide. The polylactide is characterized by comparatively low cost, and is expected as a biodegradable polymer that is melt moldable. In addition, production of a lactide that is a starting monomer of the polylactide at low cost has been enabled recently by a fermentation process in which a microorganism is used, thereby enabling the polylactide to be produced at an even further low cost, and thus use thereof as not only a biodegradable polymer but also a multipurpose polymer has been investigated.

On the other hand, although the polylactide has superior characteristics among the biodegradable polymers, due to having properties of being rigid and comparatively fragile as well as poorly flexible, compared with multipurpose polymers, it is necessary to add a softening agent in cases of manufacturing a molded product using the polylactide as a raw material. In addition, the polylactide has still insufficient heat resistance, and somewhat lacks in microwave-oven resistance. Furthermore, the polylactide also has properties of insufficient melting characteristics required in extrusion molding as well as blow molding and expansion molding.

In this regard, a technique of obtaining a resin composition superior in color tone and mechanical characteristics by melt kneading of a polylactide resin and a naturally-occurring organic filler under a specific condition is disclosed (see Japanese Unexamined Patent Application, Publication No. 2005-35134).

PRIOR ART DOCUMENTS

Patent Documents

Patent Document 1: Japanese Unexamined Patent Application, Publication No. 2005-35134

SUMMARY OF THE INVENTION

Problems to be Solved by the Invention

However, such a naturally-occurring organic filler as in the prior art described above is likely to have a hydrophilic surface, and thus tends to be inferior in dispersibility into a molding resin that is highly hydrophobic. Furthermore, in a case in which mechanical strength such as a flexural property is improved, toughness and flexibility may be impaired. Therefore, the molding material should have favorable strength and flexibility and should essentially enable the filler surface to be hydrophobilized in manufacturing a molded product, and thus various surface hydrophobilization treatments have been attempted. Additionally, mere surface hydrophobilization is hardly effective when shearing force is generated between the filler surface and the molding resin. Therefore, for imparting sufficient mechanical properties, strong interaction with an organic material such as a resin is required through, for example, providing the organic filler having a sufficiently long organic molecular chain.

The present invention was made in view of the foregoing circumstances, and an object of the invention is to provide a polylactide-grafted cellulose nanofiber that is suitable as a molding material, and a production method thereof.

Means for Solving the Problems

According to an aspect of the invention made for solving the aforementioned problems, a polylactide-grafted cellulose nanofiber includes grafted cellulose having a graft chain bonding to cellulose constituting a cellulose nanofiber, wherein the graft chain is a polylactide, and a ratio of an absorbance derived from C=O of the polylactide to an absorbance derived from O—H of the cellulose on an infrared absorption spectrum is no less than 0.01 and no greater than 1,000.

The polylactide-grafted cellulose nanofiber includes grafted cellulose, in which a graft chain bonding to the cellulose is a polylactide. Since the ratio of the absorbance derived from C=O of the carbonyl group included in the polylactide to an absorbance derived from O—H of the hydroxyl group included in cellulose on an infrared absorption spectrum is no less than 0.01 and no greater than 1,000, suitable performances as a molding material can be obtained in addition to biodegradability and rigidity of the polylactide. Moreover, in addition to use as a molding material alone, the polylactide-grafted cellulose nanofiber enables a suitable performance to be attained also as a surface-modified organic additive. The "cellulose nanofiber" as referred to herein means a fine cellulose fiber that can be obtained by defibration of a biomass such as pulp fibers, and in general, means a cellulose fiber that includes cellulose fine fibers having a width of nano size (no less than 1 mm and no greater than 1,000 mm).

According to other aspect of the present invention made for solving the aforementioned problems, a production method of a polylactide-grafted cellulose nanofiber includes carrying out graft polymerization of a lactide to cellulose constituting a cellulose nanofiber in the presence of an organic polymerization catalyst which includes an amine and a salt obtained by reacting the amine with an acid.

In the production method of a polylactide-grafted cellulose nanofiber, an organic polymerization catalyst which includes an amine and a salt obtained by reacting the amine with an acid is used as a catalyst for the graft polymerization. As a result, a graft polymerization reaction of the polylactide to the cellulose proceeds in a living polymerization manner, thereby enabling the polylactide-grafted cellulose nanofiber to be obtained accompanied by molecular weight distribution of the polylactide with a sharp pattern.

As the organic polymerization catalyst, 4-dimethylaminopyridine and 4-dimethylaminopyridinium triflate are preferred. When 4-dimethylaminopyridine and 4-dimethylaminopyridinium triflate are used as the organic polymerization catalyst, the graft polymerization reaction of the polylactide to the cellulose described above can be more promoted.

In the production method of a polylactide-grafted cellulose nanofiber, the graft polymerization is preferably repeated multiple times. Through the graft polymerization repeated multiple times, the production method of a polylactide-grafted cellulose nanofiber enables the graft polymerization reaction of the polylactide to the cellulose nanofiber to proceed efficiently, and therefore mass productivity of the polylactide-grafted cellulose nanofiber is more improved.

Effects of the Invention

The polylactide-grafted cellulose nanofiber and the production method of the aspects of the present invention enable a polylactide-grafted cellulose nanofiber that is suitable as a molding material and a surface-modified organic additive material to be obtained.

DESCRIPTION OF EMBODIMENTS

Hereinafter, the polylactide-grafted cellulose nanofiber and a production method thereof according to embodiments of the present invention are described in detail.

Polylactide-Grafted Cellulose Nanofiber

The polylactide-grafted cellulose nanofiber includes grafted cellulose having a graft chain bonding to cellulose constituting a cellulose nanofiber, in which the graft chain is a polylactide. Moreover, a ratio of the absorbance derived from C=O of the carbonyl group included in the polylactide to an absorbance derived from O—H of the hydroxyl group included in cellulose on an infrared absorption spectrum of the polylactide-grafted cellulose nanofiber is no less than 0.01 and no greater than 1,000.

Cellulose Nanofiber

The cellulose nanofiber (hereinafter, may be also referred to as "CNF") is a fiber that includes fine fibers obtained by subjecting a biomass such as pulp fibers that include cellulose to a chemical or mechanical treatment. As a production method of the cellulose nanofiber, there exist options in which cellulose per se is modified, and in which cellulose is not modified. In exemplary methods in which cellulose per se is modified, a part of hydroxyl groups of cellulose is modified to a carboxy group, a phosphoric acid ester group, etc. Of these, the method in which cellulose per se is not modified is preferred, and the reason therefor may be inferred as in the following, for example. In a polymerization reaction for a polylactide, a hydroxyl group serves as a starting point, whereas a carboxy group serves as a termination point. Since a cellulose nanofiber is used as an initiator for the polylactide-grafted cellulose nanofiber, a hydroxyl group of the cellulose nanofiber serves as the starting point of the reaction. Therefore, in the case in which a part of the hydroxyl groups of the cellulose is modified to a carboxy group, a phosphoric acid ester group, etc., the starting points of the graft polymerization reaction of the polylactide decrease, and thus the cellulose nanofiber not having been chemically modified is preferably used. The cellulose nanofiber not having been chemically modified is exemplified by a cellulose nanofiber microfabricated by a mechanical treatment. The modification amount of the hydroxyl groups of the cellulose nanofiber obtained is preferably no greater than 0.5 mmol/g, more preferably no greater than 0.3 mmol/g, and still more preferably no greater than 0.1 mmol/g.

Examples of the Pulp Fiber Include:

chemical pulp, e.g., hardwood kraft pulp (LKP) such as hardwood bleached kraft pulp (LBKP) and hardwood unbleached kraft pulp (LUKP), needle-leaved kraft pulps (NKP) such as needle-leaved bleached kraft pulp (NBKP) and needle-leaved unbleached kraft pulp (NUKP), and the like;

mechanical pulps such as stone-ground pulp (SGP), pressurized stone-ground pulp (PGW), refiner-ground pulp (RGP), chemi-ground pulp (CGP), thermo-ground pulp (TGP), ground pulp (GP), thermomechanical pulp (TMP), chemi-thermomechanical pulp (CTMP) and bleached thermomechanical pulp (BTMP).

Of these, bleached chemical pulp (LBKP, NBKP) is preferably used which contains as a principal component, cellulose having a large number of hydroxyl groups that serve as starting points of the reaction of polymerization for the polylactide.

Prior to microfabrication by a mechanical treatment of the pulp fiber in a slurry, a chemical or mechanical pretreatment may be carried out in an aqueous system. The pretreatment is carried out for reducing the energy for mechanical defibration in the microfabrication step which will follow. The pretreatment is not particularly limited as long as a procedure for the pretreatment is employed in which modification of a functional group of cellulose of the cellulose nanofiber is not caused, and the reaction in an aqueous system enabled. As described above, the cellulose nanofiber is preferably produced by a method in which the functional group of cellulose is not modified. For example, there exists a method in which a primary hydroxyl group of cellulose is preferentially oxidized by using a treatment agent in the chemical pretreatment of the pulp fiber in the slurry, with an N-oxyl compound such as a 2,2,6,6-tetramethyl-1-piperidine-N-oxy (TEMPO) radical as a catalyst, as well as a method in which a phosphoric acid-based chemical is used to modify the hydroxyl group with a phosphoric acid ester group. However, according to these methods, defibration to a level of single nano order (several nm) fiber diameter occurs at once when the mechanical defibration is conducted, and thus carrying out a miniaturization treatment may be difficult to meet a desired fiber size. Furthermore, it is considered that by decreasing the hydroxyl group that serves as the starting point of the reaction as described above, the polymerization reaction of the polylactide may be difficult to proceed. Therefore, a production method is desired in which mechanical defibration is carried out in combination with a mild chemical treatment not leading to modification of the hydroxyl group of cellulose, such as hydrolysis using, for example, a mineral acid (hydrochloric acid, sulfuric acid, phosphoric acid, etc.), an enzyme or the like. By adjusting degrees of the chemical pretreatment and the mechanical defibration, the miniaturization treatment can be carried out to meet a desired fiber size. In addition, by carrying out a pretreatment in an aqueous system, cost for recovery and/or elimination of the solvent can be reduced. The pretreatment may be carried out in concurrence with the chemical pretreatment, or in combination with the mechanical pretreatment (defibration treatment).

The cellulose nanofibers exhibit a single peak on a pseudo particle size distribution curve obtained by a measurement with a laser diffraction method in a state of having been dispersed in water. The particle diameter corresponding to the peak on the pseudo particle size distribution curve (i.e., most frequently found diameter) is preferably no less than 5 μm and no greater than 60 μm. In the case in which the cellulose nanofibers exhibit such particle size distribution, favorable performances owing to sufficient microfabrication can be achieved. It is to be noted that "pseudo particle size distribution curve" as referred to herein means a curve indicating particle size distribution based on the volume as measured by using a particle size distribution measuring equipment (for example particle size distribution analyzer of laser diffraction scattering type, available from Seishin Enterprise Co., Ltd.).

Average Fiber Diameter

It is desired that the average fiber diameter of the cellulose nanofibers is no less than 4 nm and no greater than 1,000 nm. It is considered that through miniaturization of the fibers to the average fiber width described above, the number of fibers in a molten resin per weight is increased, thereby enabling contribution to an increase in melt viscosity of the resin.

The average fiber diameter is measured by the following method.

One hundred milliliter of a dispersion liquid of the cellulose nanofibers in water having a solid content concentration of no less than 0.01% by mass and no greater than 0.1% by mass is filtered through a membrane filter made of Teflon (registered trademark), and solvent replacement is conducted with t-butanol. Next, freeze drying is carried out and coating with a metal such as osmium gives a sample for observation. With respect to this sample, an observation is performed by electron microscopic SEM imaging at any magnification of 3,000 times, 5,000 times, 10,000 times or 30,000 times, in accordance with widths of constituting fibers. Specifically, two diagonal lines are drawn on an image for observation, and three straight lines that pass the intersection of the diagonal lines are arbitrarily drawn. Furthermore, widths of 100 fibers in total that cross these three straight lines are measured by visual inspection. Then, a middle diameter of the measurements is determined as the average fiber diameter.

Degree of Crystallization

The lower limit of the degree of crystallization of the cellulose nanofibers is preferably 10%, more preferably 15%, and still more preferably 20%. When the degree of crystallization is less than 10%, the strength of the fibers per se is deteriorated, and therefore an effect of improving the melt viscosity may be impaired.

On the other hand, the upper limit of the degree of crystallization of the cellulose nanofibers is not particularly limited, but is preferably no greater than 95%, and more preferably no greater than 90%. When the degree of crystallization is greater than 95%, a proportion of strong hydrogen bonds in molecules is increased, whereby the fibers per se can be rigid; however, it is considered that the chemical modification of the cellulose nanofibers may be difficult. It is to be noted that degree of crystallization is arbitrarily adjustable by way of, for example, selection of pulp fibers, the pretreatment, the miniaturization treatment, etc. The degree of crystallization is a value measured by a X-ray diffraction analysis in accordance with "general rules for X-ray diffraction analysis" of JIS-K0131 (1996). It is to be noted that cellulose nanofiber has amorphous parts and crystalline parts, and the degree of crystallization means the proportion of crystalline parts in the entirety of the cellulose nanofibers.

Pulp Viscosity

The lower limit of the pulp viscosity of the cellulose nanofiber is preferably 0.1 cps, and more preferably 0.5 cps. When the pulp viscosity is less than 0.1 cps, resulting from a low degree of polymerization of the cellulose nanofibers, a fibrous state may not be maintained during the polymerization reaction for the polylactide, and the effect of improving the melt viscosity may be impaired.

In addition, the upper limit of the pulp viscosity of the cellulose nanofiber is preferably 50 cps, and more preferably 40 cps. When the pulp viscosity is greater than 50 cps, the degree of polymerization of the cellulose nanofiber per se is so great that the fiber is too long, whereby sufficient inhibition of aggregation of cellulose nanofibers may fail in the polymerization reaction for the polylactide, and thus the polymerization reaction for the polylactide may proceed nonuniformly. The pulp viscosity is measured in accordance with JIS-P8215 (1998). It is to be noted that a greater pulp viscosity indicates a greater degree of polymerization of the cellulose.

Type B Viscosity

In the case in which a solid content concentration of the cellulose nanofibers in the solution is 1% by mass, the lower limit of type B viscosity of the dispersion liquid is preferably 1 cps, more preferably 3 cps, and still more preferably 5 cps. When the type B viscosity of the dispersion liquid is less than 1 cps, the fibrous state may not be maintained during the polymerization reaction for the polylactide, and the effect of improving the melt viscosity may be impaired.

Meanwhile, the upper limit of the type B viscosity of the dispersion liquid is preferably 7,000 cps, more preferably 6,000 cps, and still more preferably 5,000 cps. When the type B viscosity of the dispersion liquid is greater than 7,000 cps, enormous energy is required for pumping up for transfer of a dispersion in water, whereby the production cost may be increased. The type B viscosity is measured on a dispersion liquid of the cellulose nanofibers in water having a solid content concentration of 1%, in accordance with "methods for viscosity measurement of liquid" of JIS-Z8803 (2011). The type B viscosity is a resistance torque in stirring a slurry, and a greater type B viscosity indicates a greater energy being required for the stirring.

Water-Holding Capacity

The upper limit of the water-holding capacity of the cellulose nanofiber is preferably 600%, more preferably 580%, and still more preferably 560%. When the water-holding capacity is greater than 600%, efficiencies of solvent replacement and drying are deteriorated, which may lead to an increase in production cost. The water-holding capacity is arbitrarily adjustable by way of, for example, selection of pulp fibers, the pretreatment, and the miniaturization treatment. The water-holding capacity is measured in accordance with JAPAN TAPPI No. 26: 2000.

Polylactide

The polylactide to be the graft chain is exemplified by a polymer of L-lactide, a polymer of D-lactide, a random or block copolymer of L-lactide and D-lactide, and the like.

Ratio of absorbance derived from C=O to absorbance derived from O—H on infrared absorption spectrum The polylactide-grafted cellulose nanofiber is insoluble in most solvents, and is not molten even after being heated; therefore, a structural analysis thereof through molecular weight determination by a GPC process or determination on NMR is impossible. Thus, by way of the measurement of an infrared ray absorption (hereinafter, may be also referred to as IR) spectrum, a ratio of an absorbance derived from C=O of the polylactide to an absorbance derived from O—H of the cellulose (hereinafter, may be also merely referred to as "absorbency ratio") of the polylactide-grafted cellulose nanofiber is determined, and used as a marker of the degree of grafting. The absorbency ratio is determined by measuring the IR spectrum after purifying the polylactide-grafted cellulose nanofiber with a solvent such as dichloromethane and tetrahydrofuran that is capable of dissolving the polylactide to completely eliminate the polylactide not being grafted. The lower limit of the ratio of the absorbance derived from C=O of the polylactide to the absorbance derived from O—H of the cellulose on the IR spectrum of the polylactide-grafted cellulose nanofiber is typically 0.01, and more preferably 0.05. The absorbency ratio being less than 0.01 is not preferred since characteristics as the polylactide are less likely to be exhibited. The upper limit of the absorbency ratio may be typically 1,000, and more preferably 300. When the absorbency ratio is greater than 1,000, characteristics of cellulose are tend to be hardly found.

The polylactide-grafted cellulose nanofiber is suitable as a biodegradable molding material, and as an additive of a molding material. Therefore, the polylactide-grafted cellulose nanofiber can be used: for processing to provide various types of molded products by a procedure such as injection molding, extrusion molding or blow molding; and as an additive of a resinous material such as a polylactide.

In addition, with respect to the intended usage, the polylactide-grafted cellulose nanofiber and the molding material to which the fiber is added may be used not only as an injection molded product such as a vessel, but also as a compression molded product, an extrusion molded product, a blow molded product or the like, in the form of a sheet, a film, a foamed material, fibers and the like. These molded products may be utilized for intended usage such as electronic parts, building components, civil engineering components, agricultural materials, automobile parts, daily necessities, and the like. In addition, the polylactide-grafted cellulose nanofiber may be used not only as an organic filler but also as an additive for improving performances of various types of materials, such as a nucleating agent, a crystallization retardation agent, a foamed material improving agent, a film improving agent, and the tike. Furthermore, the polylactide-grafted cellulose nanofiber may be also used as a biodegradable adhesive.

Production Method of Polylactide-Grafted Cellulose Nanofiber

Next, the production method of a polylactide-grafted cellulose nanofiber is described. According to the production method of a polylactide-grafted cellulose nanofiber, graft polymerization of a lactide to cellulose constituting a cellulose nanofiber is carried out in the presence of an organic polymerization catalyst to provide a polylactide-grafted cellulose nanofiber. More specifically, the production method of a polylactide-grafted cellulose nanofiber includes a step of carrying out graft polymerization of a lactide to the aforementioned cellulose having a hydroxyl group, in the presence of an organic polymerization catalyst which includes an amine and a salt obtained by reacting the amine with an acid. In the graft polymerization step, a ring-opened lactide is polymerized via an ester bond to each hydroxyl group of the cellulose constituting the cellulose nanofiber in the presence of the organic polymerization catalyst to give the polylactide as a graft chain.

According to the production method of a polylactide-grafted cellulose nanofiber, since the organic polymerization catalyst includes an amine and a salt obtained by reacting the amine with an acid, the graft polymerization reaction of the polylactide to the cellulose proceeds in a living polymerization manner, thereby enabling the polylactide-grafted cellulose nanofiber to be obtained accompanied by molecular weight distribution of the polylactide with a sharp pattern.

Examples of the amine in the organic polymerization catalyst include: alkylamines such aa methylamine, triethylamine and ethylenediamine; aromatic amines such as aniline; heterocyclic amines such as pyrrolidine, imidazole and pyridine; amine derivatives such as an ether amine and an amino acid; and the like. Of these, 4-dimethylaminopyridine is preferred from the viewpoint of enabling the graft polymerization reaction of the polylactide to cellulose constituting a cellulose nanofiber to be more promoted.

Examples of the acid in the organic polymerization catalyst include: inorganic acids such as hydrochloric acid; sulfonic acids such as p-toluenesulfonic acid and trifluoromethanesulfonic acid: carboxylic acids such as acetic acid; and the like. With respect to the acid, since higher acidity leads to a greater catalytic activity, p-toluenesulfonic acid and trifluoromethanesulfonic acid are preferred among the acids exemplified above, and of these, trifluoromethanesulfonic acid is more preferred.

Examples of the salt obtained by reacting the amine with the acid in the organic polymerization catalyst include 4-dimethylaminopyridinium triflate, 4-dimethylaminopyridinium tosylate, 4-dimethylaminopyridinium chloride, and the like. Of these, in tight of a capability of more promoting the graft polymerization reaction for the polylactide to cellulose constituting the cellulose nanofiber, 4-dimethylaminopyridinium triflate is preferred.

By using 4-dimethylaminopyridine and 4-dimethylaminopyridinium triflate as the organic polymerization catalyst in the production method of a polylactide-grafted cellulose nanofiber, the effect of more promoting the graft polymerization reaction for the polylactide to the cellulose nanofiber can be further enhanced.

The polylactide-grafted cellulose nanofiber can be synthesized according to the following scheme, for example.

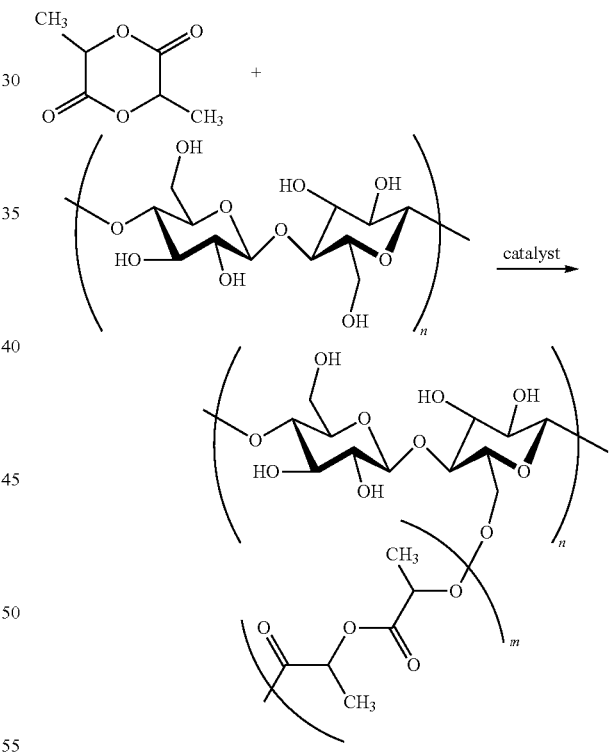

In the above scheme, n and m are each an integer of no less than 1. As described above, L-lactide, D-lactide or a combination thereof may be used as the lactide. The form of the polymer which may be adopted involves: L-polylactide or D-polylactide each obtained when L-lactide or D-lactide is used alone; a random copolymer in which the sequence order of L-lactide and D-lactide is random, which is obtained when L-lactide and D-lactide are used in combination; and a block copolymer in which L-lactide and D-lactide are polymerized block-wise in an arbitrary proportion.

In the production method of a polylactide-grafted cellulose nanofiber, it is preferred that the graft polymerization step is repeated multiple times in a case in which the grafting percentage is to be increased. By repeating the graft polymerization step multiple times, the graft polymerization reaction for the polylactide to the cellulose nanofiber can efficiently proceed, whereby the mass productivity of the polylactide-grafted cellulose nanofiber is more improved. For example, by repeating the graft polymerization step twice, the polylactide-grafted cellulose nanofiber can be efficiently produced, with the ratio of an absorbance derived from C=O of the polylactide to an absorbance derived from O—H of the cellulose on the IR spectrum of the polylactide-grafted cellulose nanofiber being no less than 0.01 and no greater than 1,000. When a further increase in the grafting percentage is intended, repeating the step necessary times is also possible.

After the polylactide-grafted cellulose nanofiber is obtained by the graft polymerization step, the polylactide not being grafted (ungrafted polylactide) is also included. The polylactide-grafted cellulose nanofiber may be used in the state of including the ungrafted polylactide; however, in order to more exert the characteristics of the polylactide-grafted cellulose nanofiber, it is preferred that the production method further includes a purification step for completely eliminating the ungrafted polylactide. A solvent for use in the purification step is not particularly limited as long as the polylactide is dissolved, and dichloromethane, tetrahydrofuran or a combination thereof is preferably used.

According to the production method of a polylactide-grafted cellulose nanofiber, the polylactide-grafted cellulose nanofiber that is biodegradable and suitable as both a molding material and a surface-modified organic additive material can be certainly produced.

Other Embodiments

The present invention is not limited to the embodiments described above, and may be put into practice in not only the above modes but in modes having been variously altered and/or modified.

EXAMPLES

Hereinafter, the present invention is mote specifically described by way of Examples, but the present invention is not limited to the following Examples.

Ratio of Absorbance Derived from C=O to Absorbance Derived from O—H on IR Spectrum The ratio of an absorbance derived from C=O of the polylactide to an absorbance derived from O—H of the cellulose on an IR spectrum was determined. The peak intensity on the IR spectrum was measured under the following conditions.
  IR measurement conditions
  apparatus: Fourier transform infrared spectrometer
    FT-IR6700 manufactured by Nicolet and DURAS-COPE
  manufactured by SeusIR Technologies
  optical resolution: 4 cm$^{-1}$
  integration count: 32
  measuring method: ATR method
  measurement absorbance: O—H deriving peak: around 3,680 cm$^{-1}$ to 3,000 cm$^{-1}$
  C=O deriving peak: around 1,890 cm$^{-1}$ to 1,520 cm$^{-1}$ Differential Scanning Calorimetry (DSC)
Measurement of the glass transition temperature, the crystallization temperature, and the heat for melting was performed by a DSC method under the conditions below. It is to be noted that the data presented in Table 3 below show results obtained in course (3) in the following temperature program (for one measurement, temperature up and temperature down were executed in the order of (1), (2), (3) below).
  apparatus: EXSTAR DSC6200, manufactured by Hitachi High-Technologies Corporation
  nitrogen flow rate: 40 ml/min.
  temperature up and cooling conditions: temperature up and temperature down being executed continuously in the order of (1), (2), (3).
  rate of temperature up and temperature down: 10° C./min.
  (1) 10° C. to 200° C.
  (2) 200° C. to 10° C.
  (3) 10° C. to 200° C.
  standard substance: alumina powder
  sample container: open aluminum pan
  sample mass: about 5 mg
One-Step Graft Polymerization Example 1

(1) Synthesis of 4-Dimethylaminopyridinium Triflate being a Polymerization Catalyst In a two-neck flask (volume: 100 ml), 1.22 g of 4-dimethylaminopyridine (manufactured by Tokyo Chemical Industry Co., Ltd., white powder) was dissolved in 20 ml of tetrahydrofuran in a dry nitrogen atmosphere. Subsequently, 1.50 g of trifluoromethanesulfonic acid was added dropwise and the mixture was stirred while the two-neck flask was cooled in a ice-cooling bath at 0° C. Thereafter, the temperature was allowed to be the room temperature, and the stirring was continued for 1 hour. The reaction mixture was filtered through a glass filter, washed with 10 ml of tetrahydrofuran twice, and then dried under reduced pressure to give quantitatively 4-dimethylaminopyridinium triflate as white powder.

(2) Preparation of Dry Cellulose Nanofiber

A raw material pulp (LBKP, solid content: 2% by mass) was subjected to a pretreatment with a beater for paper making, and thereafter a miniaturization treatment was carried out by using a high-pressure homogenizer to a level of having a single peak in pseudo particle size distribution by a particle size distribution measurement through using laser diffraction (most frequently found diameter: 30 μm), whereby a dispersion of cellulose nanofiber (hereinafter, referred to as "CNF") in water having a solid content of 2% by mass was produced. After the CNF dispersion in water was subjected to a centrifugal separator, the supernatant liquid was eliminated, a solvent was added thereto, followed by homogenization and centrifugal separation again to permit concentration. This operation was repeated several times followed by freeze drying to remove the solvent. Accordingly, CNF was prepared as white powder.

(3) Grafting of Polylactide to CNF

Into a two-neck flask (volume: 50 ml), 54 mg of CNF white powder, 6.1 mg (0.05 mmol) of 4-dimethylaminopyridine (manufactured by Tokyo Chemical Industry Co., Ltd.) white powder, 13.6 mg (0.05 mmol) of 4-dimethylaminopyridinium triflate synthesized as described above, and 720 mg (5 mmol) of colorless and transparent rod-shape crystalline L-lactide were added in a dry-nitrogen atmosphere. The two-neck flask was then heated in an oil bath at 100° C. for 1 hour to give a colorless and transparent solid.

(4) Purification of Polylactide-Grafted CNF

The colorless and transparent solid thus obtained was dissolved in 10 ml of dichloromethane, and the insoluble matter was recovered by filtration on a glass filter. To the filter residue, 20 mL of tetrahydrofuran was added, and subjected to a centrifugal separator (H-200, manufactured by KOKUSAN Co. Ltd., at 5,000 rpm for 15 min). Thereafter, the supernatant was removed, and 20 mL of tetrahydrofuran was added again and the mixture was subjected to the centrifugal separator by a similar operation followed by removing of the supernatant. Thus, ungrafted polylactide was eliminated to give 52 mg of polylactide-grafted CNF. The ratio of the absorbance derived from C═O to the absorbance derived from O—H on the IR spectrum in the polylactide-grafted CNF thus obtained was 0.8.

Example 2

Polylactide-grafted CNF was obtained in a similar manner to Example 1 except that the amount of CNF used was changed to 41 mg. The ratio of the absorbance derived from C═O to the absorbance derived from O—H on the IR spectrum in the polylactide-grafted CNF thus obtained was 2.8. The glass transition temperature of the polylactide-grafted CNF of Example 2 was 51.1° C.

Example 3

Polylactide-grafted CNF was obtained in a similar manner to Example 1 except that the amount of CNF used was changed to 27 mg. The ratio of the absorbance derived from C═O to the absorbance derived from O—H on the IR spectrum in the polylactide-grafted CNF thus obtained was 5.8. The glass transition temperature of the polylactide-grafted CNF of Example 3 was 51.6° C.

Example 4

Polylactide-grafted CNF was obtained in a similar manner to Example 1 except that the amount of CNF used was changed to 14 mg. The ratio of the absorbance derived from C═O to the absorbance derived from O—H on the IR spectrum in the polylactide-grafted CNF thus obtained was 7.1. The glass transition temperature of the polylactide-grafted CNF of Example 4 was 51.2° C.

Example 5

Polylactide-grafted CNF was obtained in a similar manner to Example 1 except that the amount of CNF used was changed to 5 mg. The ratio of the absorbance derived from C═O to the absorbance derived from O—H on the IR spectrum in the polylactide-grafted CNF thus obtained was 3.3.

Table 1 shows ratios of the absorbance derived from C═O to the absorbance derived from O—H on IR spectra of Examples 1 to 5, and glass transition temperatures. Additionally, the glass transition temperature of CNF alone is shown together in Table 1 as Reference Example 1.

TABLE 1

|  | CNF used (mg) | Polylactide-grafted CNF obtained (mg) | Ratio of absorbance derived from C═O to absorbance derived from O—H on IR spectrum | Glass transition temperature (° C.) |
|---|---|---|---|---|
| Example 1 | 54 | 52 | 0.8 | — |
| Example 2 | 41 | 39 | 2.8 | 51.1 |
| Example 3 | 27 | 27 | 5.8 | 51.6 |
| Example 4 | 14 | 11 | 7.1 | 51.2 |
| Example 5 | 5 | 5 | 3.3 | — |
| Reference Example 1 (CNF alone) | — | — | — | not detected |

Two-Step Graft Polymerization

Example 6

(1) Grafting of Polylactide to Polylactide-Grafted CNF in Second Step

Into a two-neck flask (volume: 50 ml), 5 mg of the polylactide-grafted CNF of Example 1, 6.1 mg (0.05 mmol) of white powder of 4-dimethylaminopyridine (manufactured by Tokyo Chemical Industry Co., Ltd.), 13.6 mg (0.05 mmol) of 4-dimethylaminopyridinium triflate, and 720 mg (5 mmol) of colorless and transparent rod-shaped crystals of lactide were added in a dry-nitrogen atmosphere. The two-neck flask was then heated in an oil bath at 100° C. for 1 hour to give a colorless and transparent solid.

(2) Purification of Polylactide-Grafted CNF after Graft Polymerization in Second Step The colorless and transparent solid thus obtained was dissolved in 10 ml of dichloromethane, and the insoluble matter was recovered by filtration on a glass filter. To the filter residue, 20 mL of tetrahydrofuran was added, and subjected to a centrifugal separator (H-200, manufactured by KOKUSAN Co. Ltd., at 5,000 rpm for 15 min). Thereafter, the supernatant was removed, and 20 mL of tetrahydrofuran was added again and the mixture was subjected to the centrifugal separator by a similar operation followed by removing of the supernatant. Thus, ungrafted polylactide was completely eliminated to give intended polylactide-grafted CNF (27 mg). The ratio of the absorbance derived from C═O to the absorbance derived from O—H on the IR spectrum in the polylactide-grafted CNF thus obtained was 11.2.

Example 7

Polylactide-grafted CNF was obtained in a similar manner to Example 6 except that 5 mg of the polylactide-grafted CNF of Example 2 was used in place of 5 mg of the polylactide-grafted CNF of Example 1. The ratio of the absorbance derived from C═O to the absorbance derived from O—H on the IR spectrum in the polylactide-grafted CNF thus obtained was 8.8.

Example 8

Polylactide-grafted CNF was obtained in a similar manner to Example 6 except that 5 mg of the polylactide-grafted CNF obtained in Example 3 was used in place of 5 mg of the polylactide-grafted CNF obtained in Example 1. The ratio of the absorbance derived from C=O to the absorbance derived from O—H on the IR spectrum in the polylactide-grafted CNF thus obtained was 6.6.

Table 2 shows the ratio of the absorbance derived from C=O to the absorbance derived from O—H on the IR spectrum after the grafting of the second step to the polylactide-grafted CNF.

TABLE 2

|  | Mass of polylactide-grafted CNF used (mg) | Mass of polylactide-grafted CNF obtained by second step of grafting (mg) | Ratio of absorbance derived from C=O to absorbance derived from O—H on IR spectrum |
|---|---|---|---|
| Example 6 | polylactide-grafted CNF of Example 1 | 5 | 27 | 11.2 |
| Example 7 | polylactide-grafted CNF of Example 2 | 5 | 11 | 8.8 |
| Example 8 | polylactide-grafted CNF of Example 3 | 5 | 5 | 6.6 |

Test on Crystallization Retardation Effect

One function expected for the polylactide-grafted CNF obtained according to the present invention is a retardation or facilitation effect on crystallization of a resin. As one example, when the polylactide-grafted CNF is added as an additive to a commercially available polylactide, the crystallization temperature and the heat for melting of the commercially available polylactide may be affected, and may in turn be expected to result in an improvement of moldability of the resin mixture. Thus, with respect to Examples 9 to 11 below in which the polylactide-grafted CNF was mixed with a commercially available polylactide, the crystallization temperature and the heat for melting were determined to examine the effects on the commercially available polylactide by adding the polylactide-grafted CNF. The crystallization temperature and the heat for melting were determined by a DSC method. The heat for melting was calculated in terms of an endothermic energy amount (J) per mass (g) of the polylactide component included in the measurement sample. It is to be noted that as the commercially available polylactide, a pulverized polylactide manufactured by Osaka Gas Liquid Co., Ltd. was used.

Example 9

With 0.1 mg of the polylactide-grafted CNF obtained in Example 3, 4.98 mg of the commercially available polylactide was mixed. From the results of DSC of Example 9, the crystallization temperature was 129° C., and the heat for melting was 0.15 J/g.

Example 10

With 0.23 mg of the polylactide-grafted CNF obtained in Example 3, 4.9 mg of the commercially available polylactide was mixed. From the results of DSC of Example 10, the crystallization temperature was 130° C. and the heat for melting was 0.20 J/g.

Example 11

With 0.98 mg of the polylactide-grafted CNF obtained in Example 3, 4.93 mg of the commercially available polylactide was mixed. From the results of DSC of Example 11, the crystallization temperature was 129° C. and the heat for melting was 0.21 J/g.

Comparative Example 1

The commercially available polylactide alone was employed as Comparative Example 1. From the results of DSC of Comparative Example 1, the crystallization temperature was 122° C. and the heat for melting was 0.97 J/g.

Comparative Example 2

Comparative Example 2 was similar to Example 9 except that 0.3 mg of ungrafted CNF was used in place of the polylactide-grafted CNF, and mixed with 13.4 mg of the commercially available polylactide. From the results of DSC of Comparative Example 2, the crystallization temperature was 121° C. and the heat for melting was 2.26 J/g.

TABLE 3

|  | Mixing ratio polylactide-grafted CNF and commercially available polylactide | | | Percentage | | |
|---|---|---|---|---|---|---|
|  | polylactide-grafted CNF of Example 3 (mg) | ungrafted CNF (mg) | commercially available polylactide (mg) | content of CNF in total solid content (% by mass) | Crystallization temperature (° C.) | Heat for melting (J/g) |
| Example 9 | 0.1 | — | 4.98 | 1.0 | 129 | 0.15 |
| Example 10 | 0.23 | — | 4.9 | 2.3 | 130 | 0.20 |
| Example 11 | 0.08 | — | 4.93 | 8.6 | 129 | 0.21 |
| Comparative Example 1 | — | — | 4.24 | 0 | 122 | 0.97 |
| Comparative Example 2 | — | 0.3 | 13.4 | 2.2 | 121 | 2.26 |

As indicated by the ratios of the absorbance derived from C=O to the absorbance derived from O—H on the IR spectra of Examples 1 to 5 shown in Table 1 above, it was suggested that carrying out the graft polymerization of the polylactide to the cellulose nanofiber at various grafting percentages was enabled. Moreover, as indicated by Examples 6 to 8 shown in Table 2, the ratio of the absorbance derived from C=O to the absorbance derived from O—H was prominently increased by repeating the graft polymerization step twice, revealing that efficient and significant improvement of the grafting percentage of the polylactide was enabled.

In addition, it was indicated that the mixtures of the polylactide-grafted CNFs of Examples 9 to 11 with the commercially available polylactide had higher crystallization temperatures, and required lower heat for melting than Comparative Example 1 involving the commercially available polylactide alone, and Comparative Example 2 involving the mixture of the ungrafted CNF with the commercially available polylactide.

INDUSTRIAL APPLICABILITY

The polylactide-grafted cellulose nanofiber of the present invention can be suitably used as a biodegradable molding material and a surface-modified organic additive material.

The invention claimed is:

1. A polylactide-grafted cellulose nanofiber comprising grafted cellulose which comprises a graft chain bonding to cellulose constituting a cellulose nanofiber, wherein
the graft chain is a polylactide,
a ratio of an absorbance derived from C=O of the polylactide to an absorbance derived from O—H of the cellulose on an infrared absorption spectrum is no less than 0.01 and no greater than 1,000,
the cellulose nanofiber has a width of no less than 1 nm and no greater than 1,000 nm,
the cellulose nanofiber has a degree of crystallization of no less than 20% and no greater than 90%, and
the polylactide is selected from the group consisting of a polymer of L-lactide, a polymer of D-lactide, and a random or block copolymer of L-lactide and D-lactide.

2. A production method of a polylactide-grafted cellulose nanofiber of claim 1 comprising carrying out graft polymerization of a lactide to cellulose constituting a cellulose nanofiber in the presence of an organic polymerization catalyst which comprises an amine and a salt obtained by reacting the amine with an acid.

3. The production method of a polylactide-grafted cellulose nanofiber according to claim 2, wherein the organic polymerization catalyst is 4-dimethylaminopyridine and 4-dimethylaminopyridinium triflate.

4. The production method of a polylactide-grafted cellulose nanofiber according to claim 2, wherein the graft polymerization is repeated multiple times.

5. The production method of a polylactide-grafted cellulose nanofiber according to claim 3, wherein the graft polymerization is repeated multiple times.

* * * * *